United States Patent

Nagaoka et al.

[11] Patent Number: 6,063,504
[45] Date of Patent: May 16, 2000

[54] COMPOSITE OLEFIN RESIN LAMINATED SHEET

[75] Inventors: Yoshinobu Nagaoka; Akihiko Egashira; Toshimitsu Hasegawa, all of Mie, Japan

[73] Assignee: Japan Polychem Corporation, Tokyo, Japan

[21] Appl. No.: 09/205,364

[22] Filed: Dec. 4, 1998

[30] Foreign Application Priority Data

Dec. 4, 1997 [JP] Japan .................................. 9-349940

[51] Int. Cl.[7] .......................... B32B 27/08; C08G 63/48; C08F 8/30
[52] U.S. Cl. ............................ 428/515; 525/64; 525/184
[58] Field of Search .................................. 428/515, 212; 525/184, 64, 148

[56] References Cited

U.S. PATENT DOCUMENTS

| | | | |
|---|---|---|---|
| 4,371,445 | 2/1983 | Faigle ....................................... | 508/100 |
| 4,469,741 | 9/1984 | Akao ........................................ | 428/214 |
| 4,863,792 | 9/1989 | Mrozinski ............................. | 428/315.5 |
| 4,954,388 | 9/1990 | Mallouk et al. ........................ | 428/198 |
| 4,978,572 | 12/1990 | Akao ........................................ | 428/323 |
| 5,414,032 | 5/1995 | Akao ........................................ | 524/115 |
| 5,501,887 | 3/1996 | Tanaka et al. .......................... | 428/35.2 |
| 5,504,139 | 4/1996 | Davies et al. ........................... | 524/504 |

OTHER PUBLICATIONS

Handbook of Thermoplastics, by Olabisi, Marcel Dekker, 1997, pp. 1981–1997.

*Primary Examiner*—David W. Wu
*Assistant Examiner*—Tanya Zalukaeva
*Attorney, Agent, or Firm*—Oblon, Spivak, McClelland, Maier & Neustadt, P.C.

[57] ABSTRACT

Disclosed is a composite olefin resin laminated sheet comprising a surface layer and an intermediate layer, wherein the surface layer comprises an olefin resin composite material having a melt flow rate of not higher than 20 g/10 min and a density of 1.00 to 1.90 g/cm$^3$, and the intermediate layer comprising (1) a composite olefin resin composition comprising 100 parts by weight of an olefin resin composite material having a melt flow rate of not higher than 20 g/10 min and a density of 1.00 to 1.90 g/cm$^3$ and 0.01 to 10 parts by weight of polytetrafluoroethylene or (2) an olefin resin composition comprising 100 parts by weight of an olefin resin having a melt flow rate of 0.3 to 20 g/10 min and a density of not less than 0.890 g/cm$^3$ and 0.01 to 10 parts by weight of polytetrafluoroethylene.

12 Claims, No Drawings

COMPOSITE OLEFIN RESIN LAMINATED SHEET

FIELD OF THE INVENTION

This invention relates to a composite olefin resin laminated sheet excellent in thermoformability and rigidity. More particularly, it relates to a composite resin laminated sheet suitable for thermoforming to produce containers or covers used for food packaging.

BACKGROUND OF THE INVENTION

An olefin resin sheet is excellent in heat resistance, oil resistance and the like and has been used for forming (vacuum forming, pressure forming, etc.) to produce formings, such as various containers, cups, trays, etc.

However, having sharper melt properties than other resins such as polystyrene and polyvinyl chloride, an olefin resin sheet considerably sags when preheated for thermoforming, such as vacuum forming, so that the resulting formings are apt to suffer from forming defects, such as wrinkles, thickness variation, or holes.

It is known that the sag of an olefin resin sheet in thermoforming can be reduced by using a polyblend of a polypropylene resin and a polyethylene resin, which is commonly practiced (see JP-A-52-136247 (the term "JP-A" as used herein means an "unexamined published Japanese patent application"), JP-A-55-108433 and JP-B-63-30951 (the term "JP-B" as used herein means an "examined Japanese patent publication")); adding bismaleimide to a polyolefin (see JP-A-3-52493); using a composition comprising polypropylene, an inorganic filler, and a maleic anhydride-modified or silane-modified polyolefin (see JP-A-51-69553 and JP-A-52-15542); or adding fibrous polytetrafluoroethylene to a polyolefin (see JP-A-8-165358).

In recent years the proportion of a recycled material in a molding material tends to increase, climbing to about 30 to 50% by weight in a polyolefin molding material. An olefin resin sheet molded from such a molding material with a width as large as about 900 mm or more is liable to sag particularly appreciably. In particular where a sheet is formed into thermoformings of prescribed shape with high precision, for example, a container with a cover fitted on that is designed to improve hygiene or handling properties, it must be heated for at least double the usual time, which further increases the tendency to sag.

Under such circumstances, the above-mentioned conventional techniques consisting of blending polyethylene, adding bismaleimide or mixing an inorganic filler and a modified polyolefin do not achieve sufficient improvement in sag resistance enough to be effective on wide sheets. The olefin resin sheet containing fibrous polytetrafluoroethylene is, while transparent, inferior in rigidity, heat resistance or shrink resistance and is of limited use for production of high-capacity containers or containers of specified size.

Further, it has been difficult to obtain sheeting of desired width from a polyolefin resin containing polytetrafluoroethylene by T-die extrusion because the resin has poor flow to both ends of the T-die to cause starvation.

With the recent increase of frozen food or fast food for microwave oven, vacuum forming containers having little residual strain, such as containers with a cover fitted on and deep drawn containers, have been widespread. Accordingly, it has keenly been demanded by container manufacturers to develop a forming sheet stock of larger width than 1 m to improve productivity in forming such as vacuum forming.

SUMMARY OF THE INVENTION

An object of the present invention is to provide a sheet for thermoforming which exhibits improved sag resistance in thermoforming, achieves improved productivity of formings, and provides formings having high rigidity and excellent heat resistance.

As a result of extensive investigations, the inventors of the present invention have found that the above object of the present invention is accomplished by a composite resin laminated sheet in which a resin composition comprising a specific resin material and polytetrafluoroethylene (hereinafter abbreviated as PTFE) is used and completed the present invention.

The composite olefin resin laminated sheet of the present invention has a surface layer and an intermediate layer, the surface layer comprising an olefin resin composite material having a melt flow rate of not higher than 20 g/10 min and a density of 1.00 to 1.90 g/cm$^3$, and the intermediate layer comprising (1) a composite olefin resin composition comprising 100 parts by weight of an olefin resin composite material having a melt flow rate of not higher than 20 g/10 in and a density of 1.00 to 1.90 g/cm$^3$ and 0.01 to 10 parts by weight of PTFE or (2) an olefin resin composition comprising 100 parts by weight of an olefin resin having a melt flow rate of 0.3 to 20 g/10 min and a density of not less than 0.890 g/cm$^3$ and 0.01 to 10 parts by weight of PTFE.

DETAILED DESCRIPTION OF THE INVENTION

The laminated sheet according to the present invention has a surface layer made up of the following olefin resin composite material and an intermediate layer made up of the following composite olefin resin composition or olefin resin composition (hereinafter sometimes inclusively referred to as (composite) olefin resin composition).

(1) Olefin Resin Composite Material (Surface Layer)

The olefin resin composite material comprises an olefin resin and an inorganic filler.

The olefin resin which can be used in the surface layer is not particularly limited and includes ethylene resins and propylene resins. A propylene resin consisting mainly of a propylene unit or a resin mixture mainly comprising such a propylene resin is preferred.

The propylene resin includes (1) a propylene homopolymer and (2) a random or block copolymer comprising 97% by weight or more of propylene and other α-olefin having 2 to 20 carbon atoms, preferably 2 to 12 carbon atoms, still preferably2 to 8 carbon atoms, such as ethylene, butene-1, pentene-1, hexene-1, and 4-methyl-pentene-1.

The resin mixture mainly comprising a propylene resin includes (3) a mixture of the propylene resins (1) and (2) described above and (4) a mixture of any one of the resin materials (1) to (3) described above and an ethylene resin. The ethylene resin as above referred to includes an ethylene homopolymer and a copolymer of ethylene and an α-olefin having 3 to 20 carbon atoms, preferably 3 to 12 carbon atoms, still preferably 3 to 8 carbon atoms, and having an ethylene content of 50% by weight or more. The mixing ratio of the ethylene resin is preferably not more than 40% by weight based on the resin mixture.

The propylene resin preferably has a melt flow rate (hereinafter abbreviated as MFR) of 0.3 to 20 g/10 min, particularly 0.3 to 10 g/10 min, as measured in accordance with JIS-K7210 (230° C., 2.16 kg load). If the MFR is less than 0.3 g/10 min, it tends to be difficult to mold the composite material into sheeting because a high resin pressure is required. If the MFR exceeds 20 g/10 min, surging tends to occur in sheet molding to lessen the effect in improving sag resistance.

While not limiting, the density of the propylene resin is preferably 0.89 g/cm$^3$ or more, still preferably 0.89 to 0.920 g/cm$^3$, as measured in accordance with JIS-K7112 (23° C.) from the standpoint of rigidity and impact resistance.

The ethylene resin is preferably prepared by high pressure ionic polymerization, vapor phase polymerization or solution polymerization in the presence of a Ziegler catalyst, a metallocene catalyst, etc. The ethylene resin preferably has an MFR (measured in accordance with JIS-K7210, condition 4) of not more than 10 g/10 min, particularly 0.5 to 10 g/10 min, especially 1.0 to 5.0 g/10 min.

Ethylene resins having too high or too low an MFR, i.e., too low or too high a melt viscosity tend to have poor compatibility with a propylene resin or to disturb the flow balance which causes surging or surface roughening of the sheet, resulting in forming defects.

From the viewpoint of rigidity, heat resistance, and impact resistance, a propylene homopolymer or a resin mixture of a propylene homopolymer and an ethylene-α-olefin copolymer having an ethylene content of 70% by weight or more is particularly preferred as an olefin resin material for the surface layer.

The inorganic filler is preferably non-fibrous powder. Suitable inorganic fillers include calcium carbonate, magnesium carbonate, talc, clay, mica, titanium oxide, barium sulfate, calcium sulfate, titanium dioxide, carbon black, aluminum hydroxide, aluminum oxide, magnesium hydroxide, and silica. While not limiting, the particle size of the inorganic filler is preferably 0.1 to 50 μm. The inorganic fillers can be used either individually or as a mixture of two or more thereof. Particularly preferred of the above-enumerated inorganic fillers is talc powder having a particle size of not greater than 20 μm.

The olefin resin to inorganic filler mixing ratio in the composite material is preferably 20:80 to 80:20, still preferably 40:60 to 80:20, particularly preferably 50:50 to 70:30, by weight. If the proportion of the inorganic filler exceeds 80% by weight, i.e., if the proportion of the olefin resin is less than 20% by weight, the inorganic filler is poorly dispersible in the resin, the extrudability of the composite material tends to reduce, and the formings, such as containers, are liable to be inferior in appearance, freeze resistance and impact resistance. If the proportion of the olefin resin exceeds 80% by weight, i.e., if the proportion of the inorganic filler is less than 20% by weight, the resulting formings such as containers tend to have low rigidity or low heat resistance. As a result, the possible maximum size of the formings would be limited, or complicated design would be required for structural reinforcement, which is to increase the cost of the forming mold, or productivity of containers in forming is reduced.

The olefin resin composite material is prepared by mixing the olefin resin and the inorganic filler in, e.g., a gelation mixer or a supermixer, melt kneading the mixture in a mixing apparatus, such as an extruder, a kneader, a calender roll or a combination thereof, followed by pelletizing.

The olefin resin composite material should have an MFR of not higher than 20 g/10 min, preferably not higher than 10 g/10 min, as measured in accordance with JIS-K7210 (230° C., 2.16 kg load). If the MFR is higher than 20 g/10 min, the composite material exhibits poor moldability into sheeting, and the resulting laminated sheet has poor formability into a container. With regard to the lower limit of the MFR, there is practically no limit, and even a composite material having substantially no flowability at the time of MFR measurement can be used as long as it is moldable into sheeting by means of a molding machine. However, a preferred lower limit of the MFR is 0.01 g/10 min. If the MFR is lower than this limit, the throughput reduces, and the load on the motor increases to diminish productivity.

The olefin resin composite material should have a density of 1.00 to 1.90 g/cm$^3$ as measured in accordance with JIS-K7112 (23° C.). If the density is higher than 1.90 g/cm$^3$, the flowability of the composite material reduces, and a high resin pressure is required. If the density is lower than 1.00 g/cm3, the resulting formings have insufficient rigidity and insufficient heat resistance.

(2) (Composite) Olefin Resin Composition (Intermediate Layer)

The (composite) olefin resin composition which can be used as an intermediate layer comprises (1) the above-described olefin resin composite material used in the surface layer or (2) the above-described olefin resin used in the surface layer and PTFE.

The PTFE which can be used in the present invention may be either particulate or fibrous. It is not limited by molecular weight, particle size, fiber length, etc., and any of commercially available species can be used. Powder obtained by agglomerating a high-molecular PTFE emulsion obtained by, for example, emulsion polymerization is also useful.

PTFE is used in an amount of 0.01 to 10 parts by weight, preferably 0.03 to 5 parts by weight, particularly preferably 0.05 to 3 parts by weight, per 100 parts by weight of the olefin resin composite material or the olefin resin. If used in amounts less than 0.01 part, PTFE is little effective in improving the rigidity or sag resistance. If the amount exceeds 10 parts, surging can result in sheeting, or the melt elasticity of the resulting laminated sheet becomes too high to carry out forming into containers by vacuum forming or pressure forming.

The (composite) olefin resin composition can be prepared by (1) directly mixing the olefin resin composite material or olefin resin and PTFE, (2) preparing a high concentrate master batch from the olefin resin and PTFE and mixing the master batch with the olefin resin composite material or olefin resin, or (3) mixing the olefin resin, the inorganic filler, and PTFE in a stirrer, such as a supermixer.

The mixing can be carried out in a conventional manner by use of, for example, a supermixer, a gelation mixer, etc. The resulting mixture is then melt-kneaded by means of a mixing apparatus, such as an extruder, a kneader, a calender roll, or a combination thereof, to prepare a (composite) olefin resin composition as a molding material.

If desired, the (composite) olefin resin composition can contain additives customarily added to a molding material, such as antioxidants, ultraviolet absorbers, antistatic agents, lubricants, dispersants, nucleating agents, coloring agents, corrosion inhibitors, blowing agents, and the like, or these additives may be applied to the resulting sheet.

(3) Layer Structure of Laminated Sheet

The layer structure of the laminated sheet according to the present invention is not particularly restricted as far as it has a surface layer made of the olefin resin composite material and an intermediate layer made of the (composite) olefin resin composition. Conceivable layer structures include a surface layer/intermediate layer/surface layer structure, a skin layer/surface layer/intermediate layer/surface layer/ skin layer structure, and a skin layer/surface layer/ intermediate layer/base layer structure. The laminated sheet may have two or more surface layers and/or intermediate layers with a different layer interposed therebetween. For example, the laminated sheet can have additional functional layers according to the end use, such as an adhesive layer, a gas barrier layer, a foamed layer, a recycled material layer, and a layer for impact resistance or for prevention of extruded residue. The skin layer, which is provided according to necessity, can comprise conventional polypropylene, etc.

The thickness of the laminated sheet is not particularly limited and is appropriately decided depending on the use. It is usually 0.10 to 3.0 mm and preferably, for particular use as food containers, 0.15 to 2.0 mm. The thickness ratio of the constituent layers is not limited either. Thickness variation in molding into a sheet can be improved by securing the ratio of the thickness of the surface layer at or above 3% to the total thickness of the laminated sheet. If that ratio is 5% or more, sag resistance of the laminated sheet is further improved, and formings with excellent rigidity can be obtained.

A preferred surface layer to intermediate layer thickness ratio is 3:97 to 90:10, preferably 5:95 to 70:30.

(4) Lamination

The method for producing the laminated sheet of the present invention is not particularly limited. For example, the laminated sheet is produced by single layer lamination or coextrusion. Single layer lamination can be carried out by means of a polishing mirror roll, an air knife (inclusive of a pressure roll) or a metallic mirror belt (a single or twin belt), or by T-die extrusion (the extruded film is chilled and then pressed with a metallic mirror belt), inflation or calendering. The laminated sheet of the invention is also obtained by adhering a surface layer on a sheet prepared by the above-described single layer lamination by fusion bonding or with an adhesive. Coextrusion is preferred for productivity and ease of altering the layer structure.

The composite olefin resin laminated sheet according to the present invention is suited as a sheet for thermoforming. The terminology "thermoforming" generically denotes vacuum forming comprising applying a heat-softened plastic sheet onto a desired mold and evacuating air from between the mold and the sheet and pressure forming using compressed air having a pressure above atmospheric pressure, if desired combined with vacuum.

More specifically, such thermoforming includes indirect heating thermoforming (vacuum forming, pressure forming, solid state pressure forming), solid state pressing, stamping, and combinations thereof. Formings obtainable by these forming techniques include various containers and covers thereof used in food packaging.

EXAMPLES

The present invention will now be illustrated in greater detail with reference to Examples. In Examples, measurement and evaluation were made as follows.

(1) MFR

Measured in accordance with JIS-K7210 (230° C., 2.16 kg load).

(2) Density

Measured in accordance with JIS-K7112 (23° C.).

(3) Moldability in Sheeting

Evaluated from appearance and thickness variation of a sheet on the following standards.

A The sheet is neat with no thickness variation nor roughness of interface.

B The sheet has uneven gloss due to thickness variation. It is difficult to secure a given sheet width even by adjustment of lip clearance.

C The sheet is defective due to interface roughness.

(4) Flexural Modulus

Measured in accordance with JIS-K7203.

(5) Du Pont Impact Strength

Measured in accordance with ASTM-D2794.

(6) Sag Resistance

A composite resin laminated sheet was clamped between a pair of iron frames (33 mm×33 mm×2 mm) having a 30 cm-square hole in the center and set horizontally in a heat insulating box. Upper and lower heaters set at 450° C. were slid above and below the laminated sheet each 15 cm apart from the sheet to heat the sheet uniformly from both sides. The heated sheet once sagged below the frame but, as the sheet temperature rose uniformly in the thickness direction, it became horizontal. As the heating was continued further, the laminated sheet sagged down by its own weight.

A beam of a laser set below the lower heater was aimed at the sheet to measure the sag for every second. The sag and the surface temperature of the sheet when heated for 35 seconds and the sag gradient (a sag occurring in 1-second heating) were obtained.

(7) Formability into Container (7-1) Sag Resistance

The laminated sheet was set on a vacuum forming machine manufactured by Asano Kenkyusho (FLS 415) and heated at the lower heater temperature of 350° C. and the upper heater temperature of 530° C. for 5.0 seconds, and the sag of the sheet was measured with a scale.

(7-2) Appearance

The appearance of 35 containers for each laminated sheet sample was observed with the naked eye and rated as follows.

A All the containers are satisfactory in shape with no thickness variation.

B Part of the containers suffer from wrinkles or thickness variation.

C Many of the containers suffer from wrinkles or holes due to considerable thickness variation.

(8) Freeze Resistance of Container

A container obtained by vacuum forming was filled with 250 g of rice and packaged in stretch wrap film (Yuka Wrap). After left to stand at −20° C. for 24 hours, the packaged container was dropped from a height of 1 m 10 times with its bottom down, and the change in appearance was rated as follows.

A No cracks or breaks developed at all.

B Cracks or breaks developed in parts after 4 to 9 drops.

C Cracks or breaks developed after 1 to 3 drops.

(9) Heat Resistance of Container

A container obtained by vacuum forming was left to stand in an oven (Perfect Oven, manufactured by Komatsu Kikai) set at 130° C. for 10 minutes. The container was taken out of the oven, and the percent shrinkage was measured and rated as follows.

A The dimensional change is within 3%. No change in appearance is observed.

B The dimensional change is 3 to 5%. A little change in appearance is observed.

C The dimensional change is 5% or more. The container undergoes considerable deformation.

The particulars of the propylene resin (hereinafter abbreviated as PP) and ethylene resin (hereinafter abbreviated as PE) used in Examples are tabled below.

TABLE 1

|      | MFR (g/10 min) | Density (g/cm³) | M.P. (° C.) | Trade Name (Manufacturer) |
|------|-----|-------|-----|---------------------------|
| HPP-1 | 0.5 | 0.905 | 171 | Novatec PP EA9 (Japan Polychem) |
| HPP-2 | 2.4 | 0.908 | 172 | Novatec PP FY6C (Japan Polychem) |
| HPP-3 | 30  | 0.905 | 170 | Novatec PP SA03 (Japan Polychem) |
| BPP-1 | 0.5 | 0.905 | 168 | Novatec PP EC9 (Japan Polychem) |
| BPP-2 | 1.4 | 0.905 | 167 | Novatec PP EC7 (Japan Polychem) |
| LPE-1 | 0.3 | 0.923 | 111 | Novatec LD LF122 (Japan Polychem) |
| LLPE-1 | 2.0 | 0.920 | 125 | Novatec LL SF240 (Japan Polychem) |
| Rubber | 3.6 | 0.890 | — | Tafmer A-4085 (Mitsui Petrochemical Ind., Ltd.) |
| HPE-1 | 0.3 | 0.953 | 134 | Novatec HD HB331R (Japan Polychem) |
| HPE-2 | 0.05 | 0.947 | 133 | Novatec HD HB214R (Japan Polychem) |

Example 1

A propylene block copolymer (BPP-1), an ethylene polymer (HPE-1) and talc (particle size: 10 μm, produced by Fuji Talc K.K.) were melt dispersed at a weight ratio of 60:10:30 in a gelation mixer at 170° C., and the dispersion was extruded from a single screw extruder (bore: 60 mm) at 230° C. and pelletized to obtain pellets of an olefin resin composite material having an MFR of 0.8 g/10 min and a density of 1.14 g/cm³.

The pellets were fed to an extruder (bore: 40 mm), and to another extruder (bore: 40 mm) was fed a composite olefin resin composition consisting of 100 parts by weight of the pellets and 2.5 parts by weight of PTFE (Freon Fine Powder, produced by Asahi Glass Co., Ltd.). The two compounds were melt coextruded at a resin temperature of 240° C. through a feed block die for 2 kinds and 3 layers and a T-die to obtain a 400 mm wide molten laminated sheet having a three-layered structure of olefin resin composite material/composite olefin resin composition/olefin resin composite material.

The molten laminated sheet was passed through chill rolls for polishing set at an upper roll temperature of 50° C., a middle roll temperature of 80° C., and a lower roll temperature of 50° C. to obtain a composite olefin resin laminated sheet composed of 2 kinds and 3 layers having a thickness of 0.5 mm (30/440/30 μm) and a width of 350 mm. The physical properties of the resulting composite sheet were evaluated as described above. The results obtained are shown in Table 3 below. A composite sheet showing a smaller sag and a smaller sag gradient on 35-second heating (450° C.) can be seen as excellent in sag resistance.

Examples 2 to 6 and Comparative Examples 1 to 7

Composite resin laminated sheets were prepared in the same manner as in Example 1, except for changing the concentration of PTFE, the kind of the olefin resins, the concentration of talc, etc. as shown in Table 2. The physical properties of the resulting composite sheets are shown in Table 3.

TABLE 2

| | Olefin Resin Composite Material (Surface Layer) | | | | | | (Composite) Olefin resin Composition (Intermediate Layer) | | | | | | |
|---|---|---|---|---|---|---|---|---|---|---|---|---|---|
| Example No. | PP (wt %) | PE (wt %) | Filler (wt %) | MFR (g/10 min) | Density (g/cm³) | Thickness (mm) | PP (wt %) | PE (wt %) | Filler (wt %) | MFR (g/10 min) | Density (g/cm³) | PTFE (part[1]) | Thickness (mm) |
| Ex. 1 | BPP-1 (60) | HPE-1 (10) | talc (30) | 0.8 | 1.14 | 0.03 | BPP-1 (60) | HPE-1 (10) | talc (30) | 0.8 | 1.14 | 2.5 | 0.44 |
| Ex. 2 | BPP-1 (50) | LLPE-1 (10) | talc (40) | 0.6 | 1.24 | 0.01 | BPP-1 (60) | LPE-1 (10) | talc (30) | 0.7 | 1.24 | 1.2 | 0.48 |
| Ex. 3 | BPP-2 (40) | LLPE-1 (10) | talc (50) | 0.5 | 1.40 | 0.03 | BPP-1 (70) | HPE-1 (10) | talc (20) | 0.7 | 1.05 | 0.5 | 0.44 |
| Ex. 4 | BPP-1 (70) | HPE-1 (10) | talc (20) | 0.7 | 1.05 | 0.01 | BPP-2 (40) | LLPE-1 (10) | talc (50) | 0.5 | 1.40 | 0.25 | 0.48 |
| Ex. 5 | BPP-2 (50) | LLPE-1 (10) | talc (40) | 0.6 | 1.24 | 0.05 | HPP-1 (90) | LPE-1 (10) | — | 0.5 | 0.905 | 1.5 | 0.40 |
| Ex. 6 | BPP-2 (40) | rubber (10) | talc (50) | 0.5 | 1.37 | 0.05 | BPP-1 (100) | — | — | 0.5 | 0.905 | 0.25 | 0.40 |
| Comp. Ex. 1 | HPP-1 (80) | HPE-1 (20) | — | 0.7 | 0.916 | 0.10 | HPP-1 (20) | — | talc (80) | >0.1 | 1.96 | 0 | 0.30 |
| Comp. Ex. 2 | HPP-2 (20) | — | talc (80) | 0.1> | 1.96 | 0.10 | HPP-1 (70) | HPE-1 (10) | talc (20) | 0.9 | 1.05 | 0 | 0.30 |
| Comp. Ex. 3 | HPP-1 (80) | HPE-1 (20) | — | 0.7 | 0.916 | 0.10 | HPP-1 (60) | HPE-1 (10) | talc (30) | 0.9 | 1.13 | 0.001 | 0.30 |
| Comp. Ex. 4 | HPP-1 (70) | — | talc (30) | 0.9 | 1.13 | 0.01 | HPP-3 (100) | — | — | 30 | 0.905 | 0 | 0.48 |
| Comp. Ex. 5 | HPP-3 (100) | — | — | 30 | 0.905 | 0.10 | HPP-1 (60) | HPE-1 (10) | talc (30) | 0.9 | 1.13 | 0 | 0.30 |
| Comp. Ex. 6 | HPP-1 (90) | HPE-1 (10) | PTFE (2.5) | 0.3 | 0.911 | 0.10 | HPP-1 (90) | HPE-1 (10) | — | 0.6 | 0.911 | 2.5 | 0.30 |
| Comp. Ex. 7[2] | — | — | — | — | — | — | HPP-1 (60) | HPE-1 (10) | talc (30) | 0.9 | 1.13 | 0 | 0.50 |

Note:
[1] Per 100 parts by weight of the olefin resin (composite) material.
[2] Single-layer sturcture

TABLE 3

| | Total Thickness (mm) | Sheet Mold-ability | Flexural Modulus (MPa) | Du Pont Impact Value (J) | Sag Resistance (double side heating at 450° C.) | | |
|---|---|---|---|---|---|---|---|
| | | | | | Surface Temp. (° C.) | Sag (mm) | Sag Gradient (sag/sec) |
| Example No. 1 | 0.5 | A | 3560 | 2.1 | 301 | 0 | 0.1 |
| 2 | 0.5 | A | 4210 | 2.0 | 298 | 1 | 0.3 |
| 3 | 0.5 | A | 4010 | 1.8 | 299 | 2 | 0.4 |
| 4 | 0.5 | A | 4720 | 1.8 | 300 | 10 | 0.9 |
| 5 | 0.5 | A | 3640 | 2.2 | 301 | 0 | 0.2 |
| 6 | 0.5 | A | 3950 | 2.0 | 299 | 6 | 0.6 |
| Compara. Example No. 1 | 0.5 | C | 5600 | 0.3 | unmeasurable due to hole development within 30 sec. | | |
| | defective due to interface roughness | | | | | | |
| 2 | 0.5 | C | 5920 | 0.2 | unmeasurable due to hole development within 30 sec. | | |
| | defective due to interface roughness | | | | | | |
| 3 | 0.5 | A | 2700 | 1.3 | 287 | 48 | 4.5 |
| 4 | 0.5 | C | 1600 | 1.1 | unmeasurable due to hole development within 30 sec. | | |
| | defective due to interface roughness | | | | | | |
| 5 | 0.5 | C | 2320 | 1.4 | unmeasurable due to hole devlopment within 30 sec. | | |
| | defective due to interface roughness | | | | | | |
| 6 | 0.5 | B | 1300 | 1.3 | 270 | 0 | 0.1 |
| 7 | 0.5 | A | 3510 | 0.9 | 300 | 32 | 3.5 |

EXAMPLE 7

A propylene block copolymer (BPP-1), an ethylene polymer (HPE-1) and talc (particle size: 10 μm, produced by Fuji Talc K.K.) were melt dispersed at a weight ratio of 60:10:30 in a gelation mixer at 170° C., and the dispersion was extruded from a single screw extruder (bore: 60 mm) at 230° C. and pelletized to obtain pellets of an olefin resin composite material having an MFR of 0.8 g/10 min and a density of 1.14 g/cm$^3$.

The pellets were fed to an extruder (bore: 40 mm), and to another extruder (bore: 90 mm) was fed a composite olefin resin composition consisting of 100 parts by weight of the pellets and 1.0 part by weight of PTFE (Freon Fine Powder, produced by Asahi Glass Co., Ltd.). The two compounds were melt coextruded at a resin temperature of 240° C. through a feed block die for 2 kinds and 3 layers and a T-die to obtain a 1100 mm wide molten laminated sheet having a three-layered structure of olefin resin composite material/composite olefin resin composition/olefin resin composite material.

The molten laminated sheet was passed through chill rolls for polishing set at an upper roll temperature of 60° C., a middle roll temperature of 80° C., and a lower roll temperature of 60° C. to obtain a composite olefin resin laminated sheet composed of 2 kinds and 3 layers having a thickness of 0.5 mm (50/400/50 μm) and a width of 1040 mm.

The resulting laminated sheet was thermoformed into a container of 18 cm in length, 25 cm in width and 3 cm in depth on a vacuum forming machine (FLS 415 manufactured by Asano Kenkyusho) at a lower heat temperature of 350° C. and an upper heater temperature of 530° C. in a cycle of 5.0 seconds. Thirty-five containers were prepared.

The formability of the resulting composite sheet (sag resistance of the composite sheet in forming and appearance of vacuum forming containers obtained therefrom) and freeze resistance and heat resistance of the vacuum forming containers were evaluated as described above. The results obtained are shown in Table 5 below.

Examples 8 to 10 and Comparative Examples 8 to 10

Composite resin laminated sheets and vacuum forming containers were prepared in the same manner as in Example 7, except for changing the composition of the constituent layers as shown in Table 4. The resulting composite sheets and containers were evaluated in the same manner as in Example 7. The results obtained are shown in the Table 5.

TABLE 4

| | Surface Layer | | | | | | Intermediate Layer | | | | | | | |
|---|---|---|---|---|---|---|---|---|---|---|---|---|---|---|
| | Olefin Resin Composite Material | | | | | | (Composite) Olefin Resin Composition | | | | | | | |
| Ex. No. | PP (wt %) | PE (wt %) | Filler (wt %) | MFR (g/10 min) | Density (g/cm$^3$) | Thickness (mm) | PP (wt %) | PE (wt %) | Filler (wt %) | MFR (g/10 min) | Density (g/cm$^3$) | Recycled Material (wt %) | PTFE (part) | Thickness (mm) |
| Ex. 7 | BPP-1 (60) | HPE-1 (10) | talc (30) | 0.8 | 1.14 | 0.05 | BPP-1 (60) | HPE-1 (10) | talc (30) | 0.8 | 1.14 | — | 1.0 | 0.40 |
| Ex. 8 | BPP-1 (60) | LPE-1 (10) | talc (30) | 0.8 | 1.14 | 0.05 | BPP-1 (60) | HPE-1 (10) | talc (30) | 0.8 | 1.14 | recycled olefin resin composite material (30) 70 wt % | 1.0 | 0.40 |
| Ex. 9 | BPP-2 (40) | LPE-1 (20) | talc (40) | 0.6 | 1.24 | 0.05 | BPP-1 (65) | HPE-2 (10) | talc (25) | 0.7 | 1.12 | recycled olefin resin composite material (30) 70 wt % | 0.5 | 0.40 |

TABLE 4-continued

| | Surface Layer | | | | | | Intermediate Layer | | | | | | | |
|---|---|---|---|---|---|---|---|---|---|---|---|---|---|---|
| | Olefin Resin Composite Material | | | | | | (Composite) Olefin Resin Composition | | | | | | | |
| Ex. No. | PP (wt %) | PE (wt %) | Filler (wt %) | MFR (g/10 min) | Density (g/cm³) | Thickness (mm) | PP (wt %) | PE (wt %) | Filler (wt %) | MFR (g/10 min) | Density (g/cm³) | Recycled Material (wt %) | PTFE (part) | Thickness (mm) |
| Ex. 10 | BPP-2 (40) | LPE-1 (20) | talc (40) | 0.6 | 1.24 | 0.05 | BPP-1 (90) | HPE-1 (10) | — | 1.3 | 0.910 | recycled olefin resin (50) 50 wt % | 1.0 | 0.40 |
| Comp. Ex. 8 | BPP-1 (60) | HPE-1 (10) | talc (30) | 0.8 | 1.14 | 0.05 | BPP-1 (60) | HPE-1 (10) | talc (30) | 0.8 | 1.14 | — | 0 | 0.40 |
| Comp. Ex. 9 | BPP-1 (60) | LPE-1 (10) | talc (30) | 0.8 | 1.14 | 0.05 | BPP-1 (60) | HPE-1 (10) | talc (30) | 0.8 | 1.14 | recycled olefin resin composite material (30) 70 wt % | 0 | 0.40 |
| Comp. Ex. 10 | HPP-2 (90) | LPE-1 (10) | — | 2.5 | 0.909 | 0.05 | HPP-1 (90) | HPE-1 (10) | — | 0.5 | 0.908 | recycled olefin polymer (30) 70 wt % | 1.0 | 0.40 |

Note: *Per 100 parts by weight of the (composite) olefin resin composition and the recycled material.

TABLE 5

| Example No. | Sag* (mm) | Appearance | Freeze Resistance | Heat Resistance |
|---|---|---|---|---|
| Ex. 7 | 20 | A | A | A |
| Ex. 8 | 25 | A | A | A |
| Ex. 9 | 30 | A | A | A |
| Ex. 10 | 40 | A | A | A |
| Comp. Ex. 8 | 160 | B | B | B |
| Comp. Ex. 9 | 210 | C | B | B |
| Comp. Ex. 10 | 30 | A | A | B |

Note: *Measured in accordance with test method (7-1).

(Effect of the Invention)

Since the composite olefin resin laminated sheet according to the present invention exhibits markedly improved sag resistance in thermoforming, it provides thermoformings such as food containers with little thickness variation even if a recycled material is used as a part of the polyolefin resin material in an increased proportion. Widening of the laminated sheet is not accompanied by considerable increase of sag, which makes it feasible to carry out thermoforming using a wide sheet, leading to improved productivity of thermoformings. In addition, the thermoformings obtained from the laminated sheet are excellent in rigidity, freeze resistance and heat resistance.

What is claimed is:

1. A composite olefin resin laminated sheet comprising a surface layer and an intermediate layer, wherein the surface layer comprises an olefin resin composite material having a melt flow rate of not higher than 20 g/10 min and a density of 1.00 to 1.90 g/cm³, said olefin resin composite material comprising an olefin resin material and an inorganic filler; and wherein the intermediate layer comprises (1) a composite olefin resin composition comprising 100 parts by weight of an olefin resin composite material having a melt flow rate of not higher than 20 g/10 min and a density of 1.00 to 1.90 g/cm³ and 0.01 to 10 parts by weight of polytetrafluoroethylene, said olefin resin composite material comprising an olefin resin material and an inorganic filler; or (2) an olefin resin composition comprising 100 parts by weight of an olefin resin having a melt flow rate of 0.3 to 20 g/10 min and a density of not less than 0.890 g/cm³ and 0.01 to 10 parts by weight of polytetrafluoroethylene;

wherein the olefin resin material is a propylene resin or a resin mixture mainly comprising a propylene resin.

2. The composite olefin resin laminated sheet as claimed in claim 1, wherein the propylene resin has a melt flow rate of 0.3 to 20 g/10 min and a density of not less than 0.890 g/cm³.

3. The composite olefin resin laminated sheet as claimed in claim 1, wherein the propylene resin is a propylene homopolymer.

4. The composite olefin resin laminated sheet as claimed in claim 1, wherein the propylene resin is a propylene block copolymer.

5. The composite olefin resin laminated sheet as claimed in claim 1, wherein the resin mixture comprises a propylene resin and an ethylene resin, the mixing rate of the ethylene resin being not more than 40% by weight based on the resin mixture.

6. The composite olefin resin laminated sheet as claimed in claim 5, wherein the ethylene resin has a melt flow rate of not more than 10 g/10 min.

7. The composite olefin resin laminated sheet as claimed in claim 1, wherein the inorganic filler has a particle size of 0.1 to 50 μm.

8. The composite olefin resin laminated sheet as claimed in claim 1, wherein the inorganic filler is talc having a particle size of not greater than 20 μm.

9. The composite olefin resin laminated sheet as claimed in claim 1, wherein the propylene resin or the resin mixture to inorganic filler mixing ratio in the olefin composite resin is 20:80 to 80:20 by weight.

10. The composite olefin resin laminated sheet as claimed in claim 9, wherein the propylene resin or the resin mixture to inorganic filler mixing ratio in the olefin composite resin is 40:60 to 80:20 by weight.

11. The composite olefin resin laminated sheet as claimed in claim 1, wherein the amount of polytetrafluoroethylene is 0.03 to 5 parts by weight.

12. The composite olefin resin laminated sheet as claimed in claim 1, wherein the surface layer to intermediate layer thickness ratio is 3:97 to 90:10.

* * * * *